United States Patent [19]
Heeren

[11] 3,789,239
[45] Jan. 29, 1974

[54] SIGNAL BOOST FOR SHIFT REGISTER

[75] Inventor: Richard H. Heeren, Palatine, Ill.

[73] Assignee: Teletype Corporation, Skokie, Ill.

[22] Filed: July 12, 1971

[21] Appl. No.: 161,806

[52] U.S. Cl. .............................. 307/221 C, 307/279
[51] Int. Cl. .............................................. G11c 11/40
[58] Field of Search 307/205, 221 E, 251, 279, 304; 328/165

[56] References Cited

UNITED STATES PATENTS

| | | | |
|---|---|---|---|
| 3,480,796 | 11/1969 | Polkinghorn | 307/251 |
| 3,629,618 | 12/1971 | Fujimoto | 307/251 |
| 3,626,210 | 12/1971 | Spence | 307/251 |
| 3,601,637 | 8/1971 | Spence | 307/251 |
| 3,675,043 | 7/1972 | Bell | 307/251 |
| R27,305 | 3/1972 | Polkinghorn | 307/251 |
| 3,575,609 | 4/1971 | Izumi | 307/221 C |
| 3,573,490 | 4/1971 | Sevin | 307/221 C |
| 3,599,010 | 8/1971 | Crawford | 307/221 C |
| 3,502,908 | 3/1970 | Christensen | 307/246 |
| 3,636,378 | 1/1972 | Chashi | 307/251 |
| 3,471,711 | 10/1969 | Poschenrieder | 328/165 |
| 3,586,875 | 6/1971 | Nicklas | 307/221 C |

FOREIGN PATENTS OR APPLICATIONS

| | | | |
|---|---|---|---|
| 2,029,729 | 6/1970 | Germany | 307/221 C |

*Primary Examiner*—John W. Huckert
*Assistant Examiner*—Ro E. Hart
*Attorney, Agent, or Firm*—William G. Dosse; John L. Landis

[57] ABSTRACT

A MOSFET shift register wherein capacitor nodes in each cell of the register are charged and selectively discharged and having booster capacitor nodes and clock nodes to increase slightly the voltages at the capacitor nodes in order to enhance the operation of the shift register.

19 Claims, 2 Drawing Figures

PATENTED JAN 29 1974 3,789,239

SIGNAL BOOST FOR SHIFT REGISTER

FIELD OF THE INVENTION

This invention relates to integrated circuits and more particularly to integrated circuit devices for advancing and storing data.

BACKGROUND OF THE INVENTION

U.S. patent application Ser. No. 822,520 filed on May 7, 1969, in the name of Richard H. Heeren describes a phase-splitter, inverter circuit called a "cell" herein. Two of these phase splitter, inverter circuits (cells) can be used together in accordance with the teaching of the abovementioned, copending application to provide one stage of storage in a multiple stage, shifting-type data memory. While integrated circuit devices are compact, inherently high speed, and of high reliability, still greater density, still higher speed, and still higher reliability are desirable.

Therefore, it is an object of the present invention to increase the speed of operation of a data handling circuit.

It is another object of the present invention to increase the reliability of a data handling circuit.

Yet another object of the present invention is to increase the density and further reduce the size of an integrated circuit device.

It is still another object of the present invention to improve the speed and reliability of an integrated circuit shifting-type data storage device.

Yet still another object of the present invention is to boost the voltages representing data signals in a data storage and transfer device.

A further object of the present invention is to enhance the operation of the circuit components of a data storage and handling circuit.

Still a further object of the present invention is to increase the production "yield" of integrated circuit devices.

SUMMARY OF THE INVENTION

In accordance with the present invention, data signals are invariably boosted at each stage of a shift register by an amount insufficient to alter the binary state of the information in the memory.

BRIEF DESCRIPTION OF THE DRAWING

The present invention will be more fully understood by referring to the following detailed description when considered in conjunction with the accompanying drawing in which.

DETAILED DESCRIPTION

Figures 1, 2:
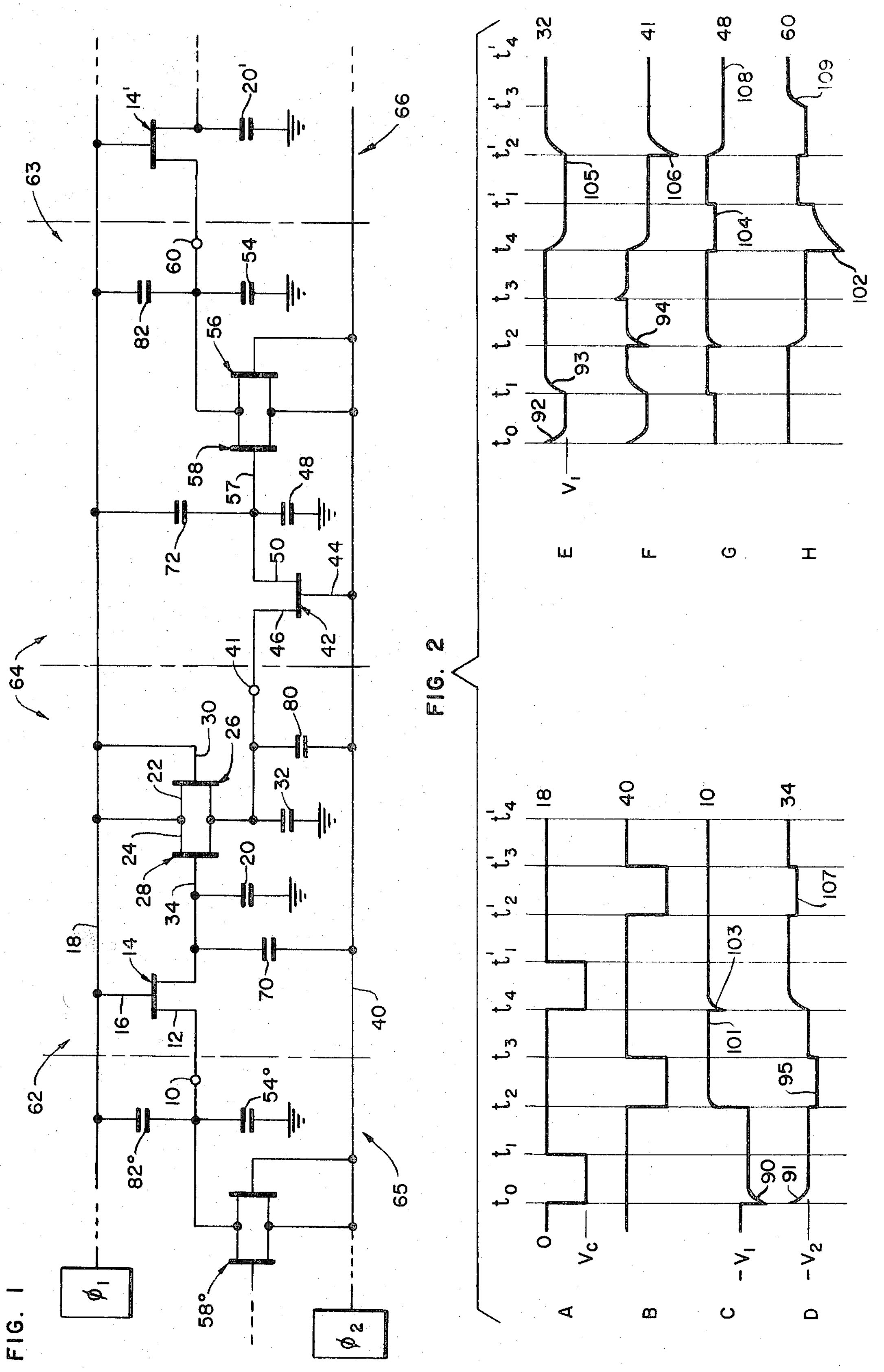
FIG. 1 shows two cells of the phase-splitter, inverter circuit of the abovementioned copending patent application, comprising one full stage of storage and including the present invention.
FIG. 2 shows selected waveform timing diagrams showing examples of the operation of the circuit of FIG. 1.

Referring now to the drawing, and more particularly to FIG. 1, a data signal in the form of a voltage charge on an output capacitor from a previous memory stage comprises a binary 0 state signal defined as ground or zero voltage, or a binary 1 state signal defined as a "substantial negative voltage," as explained hereafter.

The data signal is applied to an input terminal 10, of the memory stage described herein. The input terminal 10 is connected to a first controlled electrode 12 of a field-effect transistor 14. The gate 16 of the transistor 14 is connected to a clock bus 18, and the transistor 14 is periodically energized by a clocking signal such as a signal $\phi_1$ (FIG. 2-A). The clocking signal $\phi_1$ is applied to the gate 16 and causes the field-effect transistor 14 to pass the information from the input terminal 10 to a capacitor 20 when the clock signal $\phi_1$ is negative.

The clock signal $\phi_1$ is also applied to the common, controlled electrodes 22 and 24 of two parallel-connected field-effect transistors 26 and 28, respectively, and is also applied to the gate 30 of the field-effect transistor 26, all of which are connected to the clock bus 18. The field-effect transistor 26 is thereby turned ON when $\phi_1$ is negative, charging a capacitor 32 to substantially the negative voltage level of the clock signal $\phi_1$.

In the embodiment illustrated, P-channel, enhancement-mode MOSFETs are used. Such a FET conducts current as long as its gate is substantially more negative than its source electrode. The value of "substantially" is the MOSFET threshold voltage and is typically about 3 volts. If the $\phi_1$ voltage is chosen at about −20 volts, the capacitor 32 is charged to about −17 volts. Additionally, a positive voltage occurring almost anywhere in such a circuit will quickly be shunted to ground; because, a p-channel MOSFET is usually constructed on a grounded, N-type substrate and provides a great many P-N diode shunt paths to ground.

When the clock signal $\phi_1$ returns to ground or zero voltage, the field-effect transistor 26 is turned OFF but the capacitor 32 may remain charged to a substantial negative voltage (typically, about −17 volts). The state of the field-effect transistor 28 is controlled by the data signal voltage stored on the capacitor 20. If a substantial negative signal (more negative than about −3 volts) appears on the capacitor 20, that negative signal is applied to the gate electrode 34 of the field-effect transistor 28. The field-effect transistor 28 is turned ON by the binary 1 state signal (substantial negative voltage) applied to its gate 34 and discharges the capacitor 32 to the ground voltage then existing on the clock bus 18.

If, on the other hand, a 0 state signal (ground voltage) is present on the capacitor 20, the field-effect transistor 28 remains in an OFF (nonconductive) condition so that the substantial negative voltage (about −17 volts) remains on the capacitor 32 and is applied at an intercell reference point 41.

In this way, the signal appearing on the capacitor 32 is always of the inverse binary sense of the signal on the capacitor 20 at a fixed time after the clock signal $\phi_1$ returns to ground voltage.

Some time after the $\phi_1$ clock pulse has ended and the bus 18 has returned to ground voltage, a second $\phi_2$ clock pulse (see FIG. 2-B) begins and is carried on another clock bus 40. A field-effect transistor 42, similar to the field-effect transistor 14, has its gate 44 connected to the bus 40 and a controlled electrode 46 connected to the reference point 41. Therefore, the negative $\phi_2$ clock pulse on the bus 40 turns ON the transistor 42 which then links the capacitor 32 with another capacitor 48 that is connected to another controlled electrode 50 of the field-effect transistor 42.

If the field-effect transistor 28 is held ON by a substantial negative voltage from the capacitor 20 applied to its gate electrode 34, the capacitor 48 is also discharged to substantially ground voltage through the ON field-effect transistors 42 and 28 during the $\phi_2$ clock pulse. Similarly, if the field-effect transistor 28 is held OFF by a ground voltage on the capacitor 20, the capacitor 48 is charged to a substantial negative voltage by sharing the negative charge existing on the capacitor 32.

The voltage to which the capacitor 48 is charged depends substantially upon the capacitance values of the capacitors 32 and 48. If it is assumed that the capacitances of these two capacitors are equal, then the capacitor 48 would be charged to approximately −8 ½ volts while the capacitor 32 would be discharged by the same amount to achieve an equalibrium at approximately −8 ½ volts. If the capacitor 32 is larger and the capacitor 48 is smaller, the equalibrium voltage will be higher. Conversely, if the capacitor 32 is smaller and the capacitor 48 is larger, the equalibrium voltage will be lower. Preferably the capacitor 32 is about three times the capacitance of the capacitor 48. Therefore, the equalibrium voltage is preferably about −18 volts.

During the period of the $\phi_2$ clock pulse, a capacitor 54 is charged to a substantial negative voltage through a field-effect transistor 56 which corresponds to the field-effect transistor 26. The capacitor 54 corresponds to the capacitor 32.

After the termination of the $\phi_2$ clock signal pulse, a substantial negative charge (more negative than −3 volts) on the capacitor 48 is applied to the gate 57 of a field-effect transistor 58 and causes the capacitor 54 to discharge to ground voltage through the field-effect transistor 58. However, a ground voltage on the capacitor 48 keeps the field-effect transistor 58 OFF and prevents the capacitor 54 from discharging. The voltage present on the capacitor 54 is available at an output terminal 60 which corresponds to the input terminal 10 of the next stage of the shift register memory.

It can be seen that a first cell 62 (having the field-effect transistors 14, 26 and 28) is provided, which is functionally identical to a second cell 63 (having the field-effect transistors 42, 56 and 58), the two cells being connected to opposite clock busses. Each cell of a memory stage is an inverter as desribed in the above-mentioned, copending Heeren application. Therefore, after two inversions, the binary sense of the signal appearing at the output terminal 60 is identical to the same signal when it appeared at the input terminal 10 — only delayed by one timing cycle. One timing cycle is defined as a $\phi_1$ clock pulse plus a consecutive 100 $_2$ clock pulse. Thus, the pair of cells 62-63 constitute a full memory stage 64, which receives a data signal from a previous stage 65 and delivers the signal to a following stage 66 after the timing cycle.

The conductivity of a field-effect transistor is approximately proportional to the square of the amount by which the gate-to-source voltage exceeds the threshold voltage of the field-effect transistor. Therefore, a slight increase in gate voltage can greatly increase the conductivity of a field-effect transistor and thus increase the speed of operation of its associated circuit. Faster discharging of a circuit can also insure greater reliability by assuring complete capacitor discharge before subsequent sampling.

The conductivity of a field-effect transistor is approximately proportional to its active area on the surface of an integrated-circuit substrate wafer, or "chip." If the conduction of the field-effect transistor 28 can be enhanced, the active area of the field-effect transistors 14 and 28 can be reduced and still achieve the same speed of operation of the overall circuit.

In integrated circuit manufacture, the "yield" or percentage of usable devices in a production "batch" or "lot" generally increases with reduced active area of the devices contained therein.

BOOSTER CAPACITORS

In order to increase slightly the gate voltage of the field-effect transistor 28 and thus enhance its conduction, a small booster capacitor 70 is formed between the gate 34 of the field-effect transistor 28 and the opposite clock bus 40. Therefore, when the $\phi_2$ clock pulse occurs, the gate 34 is made slightly more negative.

It has been shown that the capacitor 48 is discharged to the ground voltage existing on the clock bus 18 during the $\phi_2$ clock pulse whenever a substantial negative voltage is present on the capacitor 20 and is applied to the gate 34 of the field-effect transistor 28. Therefore, the voltage boost caused by the capacitor 70 during the $\phi_2$ clock pulse speeds the selective discharge of the capacitors 32 and 48. By speeding the selective discharge of the capacitors of the circuit, a faster clock rate is possible. Additionally, speedier discharge of the capacitors can increase circuit reliability by preventing errors due to inadequate discharge in the time allowed for discharge.

The magnitude of the voltage booster from the capacitor 70 must be less than the threshold voltage of a field-effect transistor; because, when the capacitor 20 is in a discharged state (binary 0) and applies ground voltage to the gate 34, the voltage boost must not cause the voltage of the gate 34 to exceed the threshold voltage of the field-effect transistor 28. The voltage balance necessary can be achieved by adjusting the capacitance of the capacitor 70 in view of the capacitance of the capacitor 20 and the voltage of the $\phi_2$ clock pulse. In this case of a field-effect transistor having a threshold of approximately 3 volts, a boost of approximately 1 or 2 volts is preferred. The size of the capacitor 70 will then be quite small, approximately one tenth the capacitance of the capacitor 20, and will not seriously increase the total capacitance of the memory circuit. Increased total circuit capacitance would reduce the speed capability of the circuit.

The second cell 63 (field-effect transistors 42, 56 and 58) of the memory stage shown in FIG. 1 of the accompanying drawing can also experience a voltage boost by the addition of a booster capacitor 72 between the clock bus 18 and the gate 57 of the field-effect transistor 58. The operation of the booster capacitor 72 is identical to the operation of the booster capacitor 70.

it has previously been observed that if the field-effect transistor 28 is held in its OFF condition, the negatively-charged capacitor 32 must share its charge with the capacitor 48 when the $\phi_2$ clock pulse turns the field-effect transistor 42 ON. This means that the capacitor 48 will not have a full negative charge (preferably approximately −17 volts) and that the capacitors 32 and 48 must be so proportioned that at least about −10 (preferably −13 volts) volts is present on the capacitor 48. The proportioning of the capacitors 32 and 48 places further restrictions on the operating speed of the circuits as well as increasing the active area of the field-effect transistors of the circuit, which may adversely affect production yield. The desirability of a full-voltage charge on the capacitors 20 and 48 was discussed in connection with the explanation of the purpose of the voltage-booster capacitors 70 and 72.

In order further to produce a more nearly full negative charge (preferably approximately −17 volts) on the capacitor 48, a booster capacitor 80 is connected between the controlled electrode 46 of the field-effect transistor 42 and the $\phi_2$ clock bus 40. At the beginning of the $\phi_2$ clock pulse, the coupling of the capacitor 80 tends to make the voltage on the capacitor 32 significantly more negative. The amount of voltage boost from the capacitor 80 depends upon the voltage of the $\phi_2$ clock pulse and the proportion of the capacitances of the capacitors 32, 48 and 80. If the capacitor 80 is added to the circuit, the capacitor 32 can be made smaller in order to preserve the same overall or total circuit capacitance. Increased total circuit capacitance would reduce the maximum operating speed of the circuit.

Preferably, the capacitor 32 can be reduced from triple the capacitance of the capacitor 48 to a value equal to the capacitance of the capacitor 48. If the capacitor 80 is then made double the capacitance of the capacitor 48, the total circuit capacitance remains unchanged. However, if the $\phi_2$ clock pulse remains approximately −20 volts, the capacitive coupling of the capacitor 80, will cause the final voltage of the capacitor 48 to be approximately −17 volts at which point transistor 42 turns off; because, its gate-to-source voltage then becomes less than the 3-volt threshold necessary (as mentioned previously) to maintain conduction of the field-effect transistor 42 instead of −13 volts without the capacitor 80.

The capacitor 80 will not change the binary data stored in the capacitors 32 and 48. If the field-effect transistor 28 is held ON by a charge on the capacitor 20, the capacitors 32, 48 and 80 will still be discharged through the conductive field-effect transistor 28 long before the end of the $\phi_2$ clock pulse. The field-effect transistor 58 will then still be held OFF by the negligible voltage on the capacitor 48.

A similar booster capacitor 82 is also provided for the next cell 63 in the memory. The booster capacitor 82 functions in a manner similar to the booster capacitor 80.

It can be appreciated that the booster capacitors 80 and 82 allow for higher speed operation; or if the speed remains unchanged, the field-effect transistors 14, 28, 42 and 58 can be made smaller.

In view of the description contained in the abovementioned, copending Heeren application, it will be evident to one skilled in the art of integrated circuits that the capacitors 20 and 32 are intrinsic to the structure of a metal-oxide semiconductor field-effect transistor (MOSFET). However, there is ordinarily no significant capacitive coupling between the electrodes of the field-effect transistor 28 and the clock bus 40. Therefore, the capacitors 70 and 80 must be intentionally constructed.

REVIEW AND EXAMPLE OF OPERATION

To review the operation in terms of a specific example of the shift register stage 64 illustrated in FIG. 1, it will be assumed that the data signal sequence 1,0 is applied by the previous memory stage 65 at the left of FIG. 1 to the present memory stage 64, during two successive cycles of operation noted in FIG. 2. At the start of the timing cycle (time to, FIG. 2) a voltage representing the first bit (a binary 1) of the abovementioned data signal sequence is already being applied to the input terminal 10 of the input cell 62 of the memory stage 64 by the output capacitor 54° of the previous memory stage 65. Since the bit is a binary 1, a voltage $-V_1$ (about 17 volts in the example) is applied just prior to the time $t_O$, as indicated in FIG. 2-C.

The time interval from $t_0$ to $t_1$ (between 25 and 0.25 microseconds, typically 2.5 microsec.) is the $\phi_1$ clock pulse. As the $\phi_1$ clock pulse goes negative ($-V_c$ or about −20 volts in the example) it turns ON the FETs 14 and 26 of the input cell 62. While the FET 14 is ON, it conducts a portion of the binary 1 charge from the output capacitor 54° of the previously stage 65, and the voltage kick of the booster capacitor 82° of that stage, to the capacitor 20, as indicated by line 90 in FIG. 2-C. The capacitor 20 charges to a value of $-V_2$ during the $\phi_1$ clock pulse as indicated by the line 91 in FIG. 2-D. Typically, $V_2$ is limited to about 17 volts; because, if $V_2$ becomes greater than 17 volts and $V_c$ is only 20 volts, the FET 14 will turn OFF. Thus, the capacitor 20 stores a representation of a binary 1 input during and after the $\phi_1$ clock pulse. At the time $t_1$, the clock pulse $\phi_1$ returns to ground voltage, turning the FET 14 OFF and thus isolating the capacitor 20 from the previous stage 65 until the $\phi_1$ clock pulse of the following cycle.

Between $t_0$ and $t_1$, FET 26 turns ON to precharge the capacitor 32 (and 80) toward the $\phi_1$ clock voltage ($-Vc$ or −20 volts in the example). Capacitor 32 precharges to a value $-V_1$ (line 92, FIG. 2-E) of about 17 volts in the example. The state of the FET 28 is essentially immaterial at this time. If the input signal is a 1, the FET 24 turns ON to assist in charging capacitor 32 in parallel with the FET 26; if the input signal is a 0, the FET 28 remains OFF and has no effect.

After the time $t_1$, when the $\phi_1$ clock pulse returns to ground voltage, the capacitor 32 (and 80 in parallel) discharges to the ground voltage of $\phi_1$ if the FET 28 was turned ON (1 input), as indicated by line 93 in FIG. 2-E. Thus, the output from the first cell 62 at the time $t_2$ (in the middle of the first cycle) is the inverse of the binary input signal — a binary 0 or zero-volt signal for a binary 1 input and a binary 1 or about −17 volts for a binary 0 input. The output of the first cell 62 constitutes the input at the reference point 41 to the controlled electrode 46 of the FET 42 of the second cell 63.

At the time $t_2$, the $\phi_2$ clock bus 40 goes negative to turn ON the FETS 42 and 56 (corresponding to the FETs 14 and 26 in the first cell 62). The FET 42 permits transmission of a portion of the charge from the parallel capacitors 32 and 80, to the storage capacitor 48. In the example of a binary 1 input to the first cell 62, the output from the first cell 62 at the intercell reference point 41 is essentially zero volts at the time $t_2$ (FIG. 2-F), thus, the voltage boost 94 (FIG. 2-F) supplied by the capacitor 80 during the $\phi_2$ pulse is ineffectual to turn the FET 58 ON; because, the boost charge is quickly dissipated to the grounded $\phi_1$ bus 18 through the FET 28, which remains ON during the $\phi_2$ pulse.

During the $\phi_2$ pulse, the booster capacitor 70 is also energized to add a "voltage kick" 95 (FIG. 2-D) of typically 1 or 2 volts to the capacitor 20 output. As previously discussed, this augments the conductivity of the FET 28 by boosting the gate signal and assures rapid discharge of the capacitors 32, 80, and 48 to the grounded $\phi_1$ bus 18 during the $\phi_2$ clock pulse. Thus, at the end of the $\phi_2$ clock pulse (time $t_3$), the capacitor 48 stores very close to zero volts (FIG. 2-G) since the output of the first cell 62 was a binary 0. This insures that the FET 58 does not operate. The booster capacitor 70 assures that only a minimum time is required to assure the discharge of the capacitors 32, 48, and 80.

During the $\phi_2$ clock pulse, the output storage capacitor 54 of the second cell 63 is precharged from the $\phi_2$ bus 40 to $-V_2$, −17 volts in the example (FIG. 2-H), similarly to the capacitor 32 in the first cell. Since the FET 58 remains OFF in the example (1 input at the terminal 10), the capacitor 54 remains charged after the time $t_3$ (FIG. 2-I) to provide a binary 1 output signal at the output point 60. This binary 1 signal is then available to the next stage 66 after the time $t_4$ when the $\phi_1$ clock bus 18 goes negative again. This will be read by the next stage 66 during the $\phi_1$ clock pulse of the next cycle.

Since it has been assumed that the next bit at the input terminal 10 is a binary 0 (essentially zero volts), the output capacitor 54° of the previous stage 65 has been discharged during the $\phi_2$ clock pulse of the first cycle (through an ON FET 58° corresponding to the FET 58 of the cell 63). This is shown as the zero-voltage signal 101 in FIG. 2-C.

When the $\phi_1$ clock pulse again goes negative, times $t_4$ to $t_1'$, the following things happen:

1. The binary 1 signal of the output terminal 60 from the memory stage 64 is transferred through a gating FET 14' to a capacitor 20' of the following stage 66.

2. Simultaneously, the booster capacitor 82 is energized from the $\phi_1$ clock pulse to add its kick 102 (FIG. 2-H) to the charge on the capacitor 54 to assure maximum charging of the capacitor 20', as previously explained. This completes read-out from the memory stage 65 to the memory stage 66.

3. FET 14 turns ON again, this time to transfer the binary 0 input at the terminal 10 to the capacitor 20. To do this, capacitors 20 and 70 discharge to the grounded $\phi_2$ clock bus 40 through a now-ON FET 58° of the previous stage 65 in the manner previously described, thus dissipating the charge that kept the FET 28 ON during the first cycle. Since the capacitor 20 is discharged to ground voltage, the FET 28 is turned OFF.

4. A voltage kick 103 (FIG. 2-C) is applied by the booster capacitor 82° of the previous stage, but this is also quickly dissipated to the grounded $\phi_2$ clock bus 40 through the FET 58' and does not keep the FET 28 ON.

5. At the same time, the FET 26 is turned ON by the $\phi_1$ clock pulse and precharges the capacitors 32 and 80 and $-V_1$ (approximately 17 volts).

6. The booster capacitor 72 is momentarily operated to apply its negative kick 104 (FIG. 2-G) to the gate electrode 57 of the OFF FET 58, but this kick is chosen to be far too small to operate that FET, thus the booster capacitor 72 has no effect at this time.

When the $\phi_1$ clock pulse returns to ground voltage, at time $t_1'$:

1. The FET 14 turns OFF to isolate the zero-volt charge on the capacitor 20 from the input terminal 10.

2. The FET 26 turns OFF to isolate the precharge of $-V_1$ on the capacitors 32 and 80 (FIG. 2-E). Since the FET 28 remains OFF in this case (binary 0 input), the capacitors 32 and 80 remain charged after time $t_1'$ as indicated by the line 105, to provide the inverted, or binary 1, input to the second cell 63 of the stage 64.

When the $\phi_2$ clock pulse becomes negative (time $t_2'$):

1. The booster capacitor 80 adds its kick 106 (FIG. 2-F) to the binary 1 output of the capacitor 32 to apply a high negative voltage signal to the point 41 and the controlled electrode 46 of the FET 42.

2. The FET turns ON to permit the combined capacitors 32 and 80 to transfer a high negative charge to the capacitors 48 and 72 during the $\phi_2$ clock pulse.

3. The FET 58 turns ON from the high negative voltage at its gate 57 resulting from the transferred charge on the capacitors 48 and 72.

4. The FET 56 turns ON from the $\phi_2$ clock pulse to precharge the capacitors 54 and 82 through the FETs 56 and 58.

5. The booster capacitor 70 boosts the voltage of the gate 34 of the FET 28 by a negligible amount 107 (FIG. 2-D).

At the end of the $\phi_2$ clock pulse (times $t_3'$):

1. The FET 42 turns OFF to isolate the binary 1 signal on the capacitors 48 and 72 from the point 41, line 108 on FIG. 2-G. The negative charge on the capacitors 48 and 72 maintains the FET 58 ON;

2. The capacitor 54 discharges (line 109 of FIG. 2-H) to the grounded $\phi_2$ bus 40 through the ON FET 58, thus providing the binary 0 output signal at the output terminal 60 (FIG. 2-H) at the end of the second cycle ($t_4'$).

Thus, during each cycle of operation, each first cell 62 receives the data input signal (such as at the terminal 10) during the first clock pulse ($\phi_1$), transmits an inverse of the input signal to each second cell 63 during the second clock pulse ($\phi_2$), so that the output terminal, such as 60, to the next stage (66) carries a signal that is identical to the original input signal. The pairs of booster capacitors increase signal voltages during the opposite half cycles to augment the 1 signals where extant but to have no practical effect on the 0 signals, as described, thus enhancing the operation of the FET's 28 and 58 selectively to ground their associated capacitors at the appropriate times to provide for faster and more reliable operation of each cell with smaller FET areas.

While specific examples and embodiments have been described in detail above, it will be apparent that various modifications may be made from the specific details described without departing from the spirit and scope of the invention.

What is claimed is:

1. In combination:

two clock conductors;

a first gating device having a control electrode and two controlled electrodes, the control electrode being connected to a first clock conductor;

a first storage device connected to a first controlled electrode of the first gating device;

a second gating device having a control electrode and two controlled electrodes, a first one of the controlled electrodes being connected to the first clock conductor, and the control electrode being connected to the first controlled electrode of the first gating device; and a first coupling device connected directly between the second clock conductor and the first controlled electrode of the first gating device.

2. A combination according to claim 1 further comprising:

a second storage device connected to the second controlled electrode of the second gating device.

3. A combination according tO claim 2 further comprising:

a third gating device having a control electrode and two controlled electrodes, the control electrode and a first one of the controlled electrodes being connected to the first clock conductor and the second controlled electrode being connected to the second controlled electrode of the second gating device.

4. A combination according to claim 2 further comprising:

a second coupling device connected between the second clock conductor and the second controlled electrode of the second gating device.

5. An improved memory circuit including at least one clock conductor; means for transferring a binary data input signal to a first storage means, and gating means responsive to the first storage means for gating a corresponding binary data output signal, wherein the improvement comprises:

means responsive to a clock signal for increasing the signal stored in the storage means by substantially a constant magnitude irrespective of the binary sense of the signal stored therein.

6. A circuit according to claim 5 further comprising a second storage means responsive to the operation of the gating means for storing the data output signal.

7. A circuit according to claim 6 further comprising booster means responsive to the clock signal for increasing the data output signal by a substantial magnitude irrespective of the binary sense of the output signal.

8. A shift register comprising a series of memory stages, each comprising two inverter cells, each cell inverting a succession of output binary data signals from a preceding cell and transferring the inverted signals to a subsequent cell, the shift register responding to a two-phase clock signal applied to first and second clock conductors for operating adjacent cells alternately to shift the inverted data signal from each cell to the next, each cell comprising:

a. a first memory capacitor;

b. a first FET having its gate connected to the first clock conductor, a first controlled electrode connected to the output signal from the preceding cell, and a second controlled electrode connected to the memory capacitor, so that the first FET connects the output signal from the preceding cell to the memory capacitor during each clock pulse of a first clock $\phi_1$, and the memory capacitor is thereafter isolated from the preceding cell by the first FET until the next cycle of $\phi_1$, the memory capacitor storing a charge representing the output signal from the preceding cell;

c. a second FET having its gate connected to the second controlled electrode of the first FET so that the memory capacitor voltage is applied to that gate, the memory capacitor charge being either a voltage above the threshold voltage of the second FET if a binary 1 is being stored, or near 0 volts if a binary 0 is being stored.

d. means, triggered by the $\phi_1$ clock pulse and governed by the state of the second FET after $\phi_1$, for providing an output data signal from the cell comprising the inversion of the input signal from the preceding cell, the output signal being connected to the first FET of the following cell during a second clock pulse $\phi_2$; and e. a first booster capacitor connected between the second clock conductor and the second controlled electrode of the first FET so as to supplement the voltage applied by the first memory capacitor to the gate of the second FET during $\phi_2$, the booster capacitor providing insufficient voltage to the gate to operate the second FET when the first capacitor is storing a 0, but enhancing the operation of the second FET by a fixed and constant amount when a 1 is being stored.

9. A shift register as recited in claim 8, wherein the first memory capacitor comprises and the first booster capacitor comprises a discretely-formed integrated-circuit capacitor.

10. A shift register as recited in claim 8, wherein a first controlled electrode of the second FET is connected to the first clock conductor, and wherein the means (d) for providing the inverted output signal comprises:

a second memory capacitor connected to the second controlled electrode of the second FET; and means for precharging the second memory capacitor to the 1 cell-output voltage only during the $\phi_1$ clock pulse, regardless of the state of the second FET, so that the second memory capacitor discharges to the ground of the $\phi_1$ clock conductor after the $\phi_1$ clock pulse if the second FET is ON (the first memory capacitor is storing a 1) and remains charged until after $\phi_2$ clock pulse if the second FET is OFF (the first memory capacitor is storing a binary 0), the second memory capacitor being connected to the first controlled electrode of the first FET of the following cell so as to provide the input signal to the following cell representing the inversion of the input to the cell in question.

11. A shift register as recited in claim 10, further comprising a second booster capacitor connected between the second clock conductor and the second controlled electrode of the second FET, for applying, during the $\phi_2$ clock pulse, a supplemental voltage to the first memory capacitor of the following cell through the first FET of the following cell, the supplemental voltage being selected to augment the 1 charge if present on the second memory capacitor, but to substantially discharge through the second FET to the ground of the $\phi_1$ clock conductor if the second memory capacitor is storing a zero.

12. A shift register as recited in claim 11, wherein the first and second memory capacitors are intrinsic capacitances of an integrated-circuit and the first and second booster capacitors are discretely-formed, integrated-circuit capacitors.

13. A shift register as recited in claim 12, wherein the means for precharging the second memory capacitor comprises a third FET having its gate connected to the $\phi_1$ clock conductor, its first controlled electrode connected to the first controlled electrode of the second FET and to the $\phi_1$ clock conductor, and its second controlled electrode connected to the second controlled electrode of the second FET and to the second memory capacitor and the second booster capacitor, whereby the third FET operates during the $\phi_1$ clock pulse to precharge the second memorY capacitor from the $\phi_1$ clock voltage, while precluding discharge of the second memory capacitor through the third FET to the $\phi_1$ clock ground after the $\phi_1$ pulse.

14. A method of improving the operation of a binary data signal storage and transfer circuit comprising:

boosting the magnitude of each signal of either binary state by a fixed magnitude; and limiting the magnitude to an amount insufficient to change the binary state of any signal.

15. In a data-processing system of the type wherein one of two voltages indicating the state of a binary data signal is stored on a memory capacitor which is later coupled, in response to clock signal, to the gate of a switching device of the type requiring a threshold gate voltage to turn ON, and wherein a first of the possible capacitor charges applies a gate voltage above the threshold voltage and the second possible charges applies approximately zero volts or a voltage well below the threshold voltage, the improvement which comprises:

applying a booster voltage to the gate of the switching device in response to the clock signal, the booster voltage supplementing any voltage applied by the memory capacitor so as to augment by a fixed and constant amount the operation of the switching device when the capacitor is storing the first charge, but the booster voltage being well below that required to operate the switching device when the capacitor is storing the second charge.

16. An improved inverter circuit comprising:

first clock means for generating clock pulses;

a first storage means for storing information;

means responsive to the first clock means for preparing the storage means and removing any information stored therein;

a source of data input signals;

means responsive to the data input signals for selectively adjusting the storage means and thereby storing information therein;

second clock means for generating second clock pulses alternating with the clock pulses generated by the first clock means; and means responsive to the second clock pulses for boosting the contents of the first storage means by a fixed and constant amount irrespective of the nature of the data signals.

17. An inverter according to claim 16 wherein the boosting means comprises a second storage means connected between the first storage means and the second clock means.

18. In combination:

two clock conductors;

a first gating device having a control electrode and two controlled electrodes, the control electrode being connected to a first clock conductor;

a first storage device connected to a first controlled electrode of the first gating device;

a second gating device having a control electrode and two controlled electrodes, a first one of the controlled electrodes being connected to the first clock conductor, and the control electrode being connected to the first controlled electrode of the first gating device; and a single capacitor connected between the second clock conductor and the first controlled electrode of the first gating device.

19. A method of improviing the operation of a binary data signal storage and transfer circuit comprising:

boosting the magnitude of each signal of both binary states by a fixed magnitude; and limiting the magnitude to an amount insufficient to change the binary state of any signal.

* * * * *